(12) United States Patent
Sylvester et al.

(10) Patent No.: US 12,712,383 B1
(45) Date of Patent: Aug. 18, 2026

(54) REINFORCED ROADWAY WITH WIRELESS CHARGING

(71) Applicant: INTEGRATED ROADWAYS IP LLC, Miami Beach, FL (US)

(72) Inventors: Tim Sylvester, Kansas City, MO (US); Tiziano Pedersoli, Overland Park, KS (US)

(73) Assignee: INTEGRATED ROADWAYS IP LLC, Miami Beach, FL (US)

( * ) Notice: Subject to any disclaimer, the term of this patent is extended or adjusted under 35 U.S.C. 154(b) by 909 days.

(21) Appl. No.: 18/145,079

(22) Filed: Dec. 22, 2022

(51) Int. Cl.

| | |
|---|---|
| ***H02J 7/00*** | (2026.01) |
| ***H02J 50/00*** | (2016.01) |
| ***H02J 50/10*** | (2016.01) |
| ***H02J 50/40*** | (2016.01) |
| ***H02J 50/60*** | (2016.01) |

(52) U.S. Cl.
CPC ............ *H02J 50/005* (2020.01); *H02J 50/10* (2016.02); *H02J 50/402* (2020.01); *H02J 50/60* (2016.02)

(58) Field of Classification Search
None
See application file for complete search history.

(56) References Cited

U.S. PATENT DOCUMENTS

2004/0076473 A1* 4/2004 Burkhart ................. E03F 5/106 405/39
2008/0265684 A1* 10/2008 Farkas .................... B60L 58/40 307/104
2013/0328387 A1 12/2013 Venkateswaran et al.
2014/0217829 A1 8/2014 Cho et al.
2017/0136899 A1 5/2017 Mashinsky
2020/0204004 A1 6/2020 Jang

FOREIGN PATENT DOCUMENTS

CN 106030979 A 10/2016

* cited by examiner

*Primary Examiner* — Arun C Williams
(74) *Attorney, Agent, or Firm* — Fredrikson & Byron, P.A.

(57) ABSTRACT

A roadway section configured to wirelessly charge a vehicle driving on the roadway section. The roadway section comprises a reinforcement layer embedded within the roadway section. The roadway section additionally comprises a wireless power charger embedded within the roadway section, with the wireless power charger being configured to transmit energy wirelessly to the vehicle.

20 Claims, 8 Drawing Sheets

REINFORCED ROADWAY WITH WIRELESS CHARGING

CROSS-REFERENCE TO RELATED APPLICATIONS

The present application is filed contemporaneously with identically-titled U.S. patent application Ser. No. 18/145,069, filed Dec. 22, 2022, the entire disclosure of which is hereby incorporated by reference herein.

FIELD OF THE INVENTION

Embodiments of the present invention relate to roadways with wireless charging. More particularly, embodiments, of the present invention relate to a reinforced roadway configured to provide wireless charging to vehicles traveling on the roadway.

BACKGROUND

Recent advances in electric motors and electrical power storage have facilitated an increase in the manufacture and use of electric vehicles, some of which implement autonomous and/or self-driving technologies. Previously, electric vehicles were dependent on being recharged at periodic or regular intervals. For example, for a daily-commuter electric vehicle, the vehicle's battery would generally be recharged at the operator's home overnight. Alternatively, for a long-haul electric vehicle, the vehicle's battery would generally be recharged periodically, at stops during the trip, once the battery level of the vehicle had been sufficiently depleted. Unfortunately, such periodic charging of electric vehicles is inconvenient and burdensome for the operator. For instance, the single charge range of the daily-commuter electric vehicle can place restrictions on how far the operator can commute each day. Similar inconveniences are present with the long-haul electric vehicle. Further, the charging time needed to recharge an electric vehicle once stopped at a charging station can necessitate a significant increase in travel time for the operator of the long-haul electric vehicle. Furthermore, many geographic locations have limited charging stations, which can make it difficult for electric vehicle operators to find suitable locations to charge.

In view of the above, it would be beneficial to provide charging systems that can recharge vehicles (e.g., the batteries of electric vehicles) during travel, so as to increase the range of the electric vehicles without requiring the additional time and cost associated with stopping the electric vehicles to recharge (e.g., at home, at work, or otherwise at charging stations). In particular, there is a need for wireless charging systems for roads, which can wirelessly charge vehicles as the vehicles travel on the roads. Furthermore, there is a need for such roads to be formed with suitable reinforcements, such that the roads have sufficient strength, integrity, and/or durability to facilitate vehicular travel thereon.

SUMMARY OF THE INVENTION

Embodiments of the present invention address one or more of the above-mentioned problems and provide a distinct advance in the art of charging vehicles, and particularly electric vehicles. Specifically, embodiments of the present invention may provide a roadway section configured to wirelessly charge a vehicle driving on the roadway section. The roadway section comprises a reinforcement layer embedded within the roadway section, with the reinforcement layer comprising magnetic shielding material. The roadway section additionally comprises a wireless power charger embedded within the roadway section, with the wireless power charger being configured to transmit energy wirelessly to the vehicle. The wireless power charger is positioned above the reinforcement layer.

Additional embodiments of the present invention may provide a method of wirelessly charging a vehicle traveling over a roadway section. The method comprises a step of providing a reinforcement layer embedded within the roadway section, with the reinforcement layer comprising magnetic shielding material. An additional step includes providing a wireless power charger embedded within the roadway section, with the wireless power charger being positioned above the reinforcement layer. A further step includes transmitting, via the wireless power charger, energy wirelessly to the vehicle as the vehicle travels over the roadway section.

Additional embodiments of the present invention may provide another roadway section configured to wirelessly charge a vehicle driving on the roadway section. The roadway section comprises a reinforcement layer embedded within the roadway section, with the reinforcement layer comprising non-magnetic shielding material. The roadway section further comprises a wireless power charger embedded within the roadway section, with the wireless power charger being configured to transmit energy wirelessly to the vehicle.

Further embodiments of the present invention may provide another method of wirelessly charging a vehicle traveling over a roadway section. The method comprises a step of providing a reinforcement layer embedded within the roadway section, with the reinforcement layer comprising non-magnetic shielding material. An additional step includes providing a wireless power charger embedded within the roadway section. A further step includes transmitting, via the wireless power charger, energy wirelessly to the vehicle as the vehicle travels over the roadway section.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
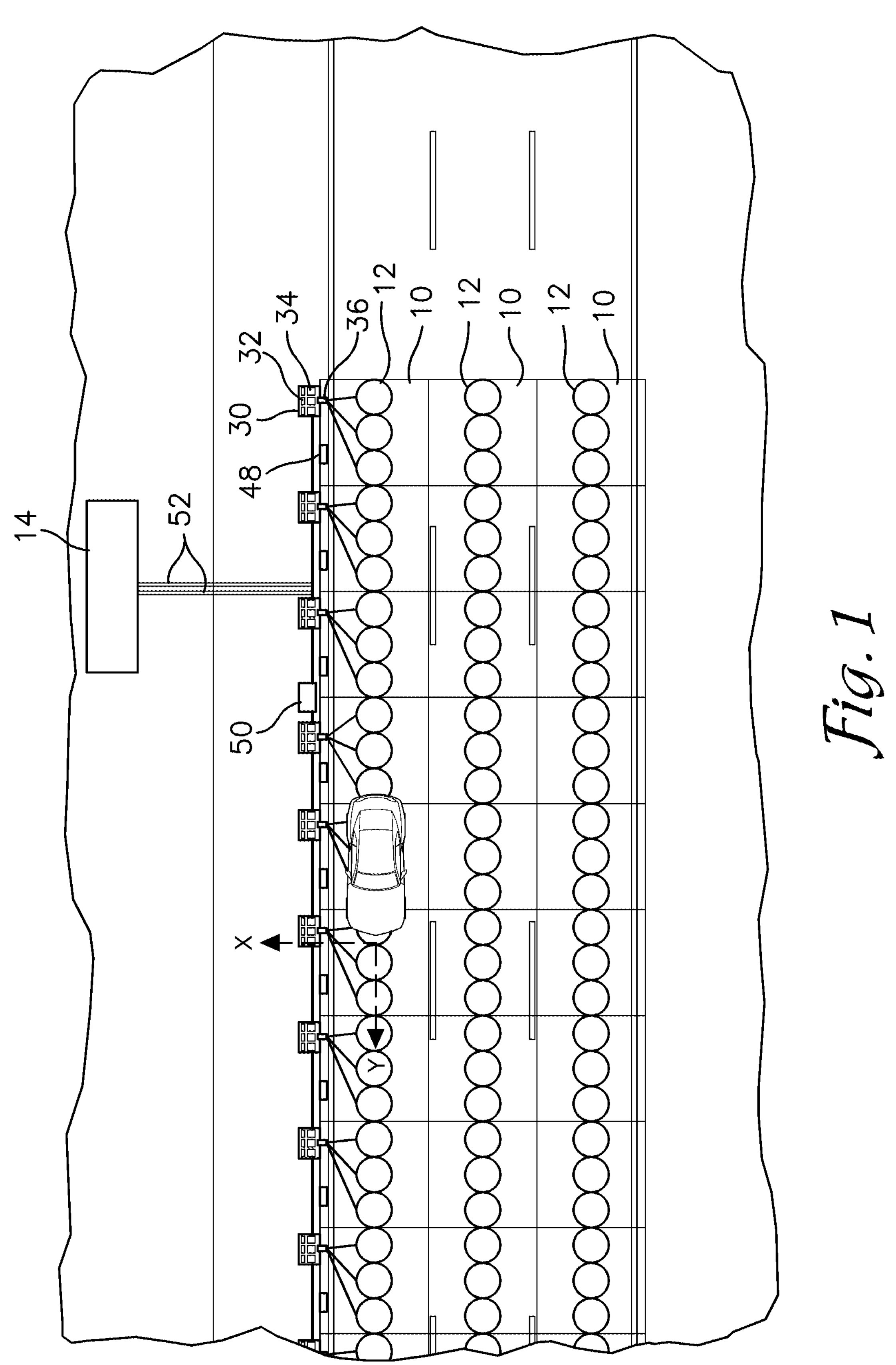
FIG. 1 is a top schematic view of a wireless charging system for a road according to embodiments of the present invention, particularly illustrating the system transmitting wireless power to a vehicle traveling on a surface of the road.

The drawing figures do not limit the current invention to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Relational and/or directional terms, such as "above", "below", "up", "upper", "upward", "down", "downward", "lower", "top", "bottom", "outer", "inner", etc., along with orientation terms, such as "horizontal" and "vertical", may be used throughout this description. These terms retain their commonly accepted definitions and are used with reference to embodiments of the technology and the positions, directions, and orientations thereof shown in the accompanying figures. Embodiments of the technology may be positioned and oriented in other ways or move in other directions. Therefore, the terms do not limit the scope of the current technology.

Embodiments of the present invention include a wireless charging system for a road. Such a wireless charging system and road may be described elsewhere herein as a "pavement system." FIG. 1 illustrates an exemplary pavement system in accordance with embodiments of the present invention. In more detail, the pavement system includes a plurality of roadway sections 10, illustrated in FIGS. 1-4, aligned along a longitudinal or y-axis corresponding to a direction of travel of vehicles or other masses across top surfaces of the roadway sections 10. The illustrative pavement system includes three (3) lanes, each being respectively formed from a plurality of roadway sections 10 aligned along the y-axis. Each lane may include one or more roadway sections 10. It is foreseen that the pavement system may include more or fewer lanes without departing from the spirit of the present invention.

The roadway sections 10 may be pre-cast slabs comprising concrete paving material, described in the exemplary embodiments in more detail below. It should be noted, however, that in one or more embodiments the pavement system may comprise one or more lanes formed of cast-in-place concrete installations, continuous pour asphalt pavement material, or other pavement types. In cast-in-place installations, roadway sections may include one or more lengths of roadway separated by saw cut joints, typically made to reduce the chances of roadway damage/cracking from cyclical expansion and contraction.

Each roadway section 10 of the illustrated embodiment may include three (3) wireless power chargers 12. The wireless power chargers 12 may include or comprise wireless charge emitters and/or transceivers. Each wireless charge emitter and/or transceiver preferably includes one or more inductive coil(s) or layers of conductive material configured to conduct current of supplied power in a spatial pattern that generates and projects an electromagnetic (EMF) field extending up and above the top surface of the corresponding roadway section 10 for wireless battery charging of passing vehicles (e.g., according to Faraday's law of induced voltage). Each of the wireless power chargers 12 may be configured for unidirectional charging of batteries of vehicles passing along a top surface of the roadway sections 10 or for bidirectional charging in communication with electrical circuits positioned on or adjacent to the top surface of the slabs. One of ordinary skill will appreciate that an individual slab or roadway section 10 may include more or fewer wireless power chargers 12, at different and/or variable spacing and/or of different configuration/shape, without departing from the spirit of the present invention.

Figure 5:
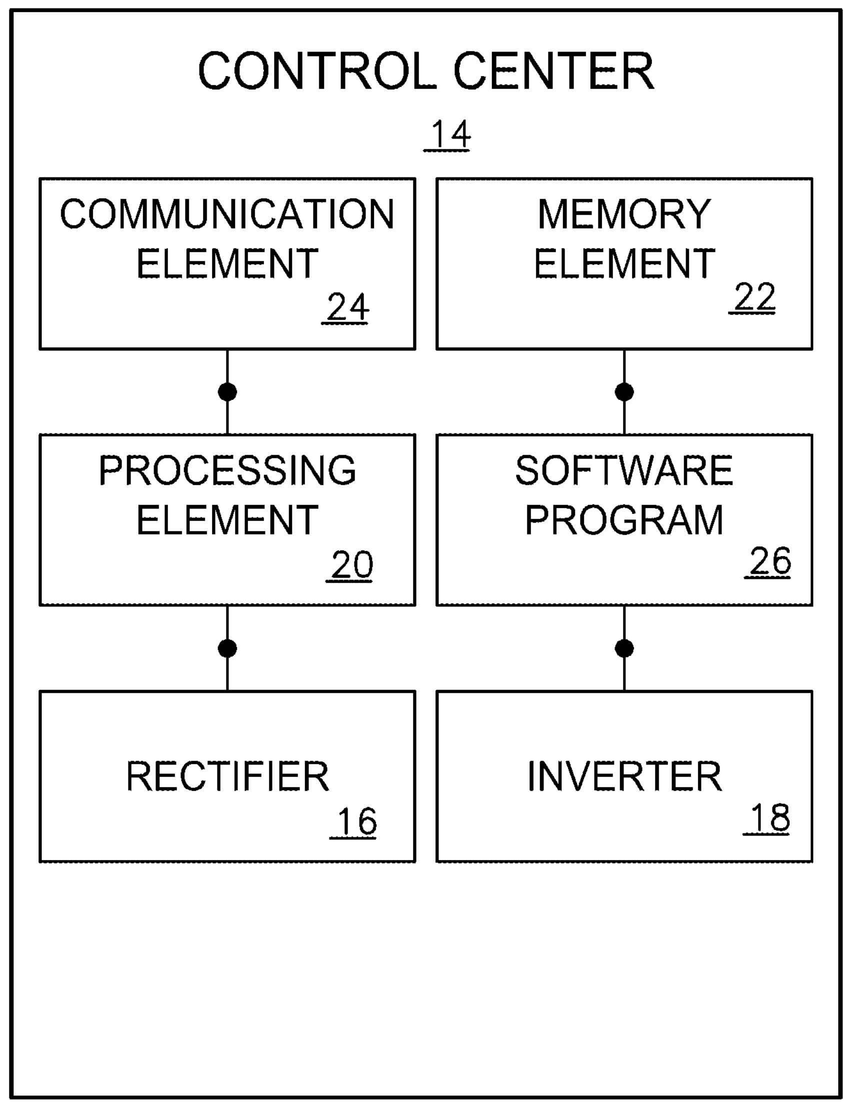
FIG. 5 is a schematic block diagram of a control center of the wireless charging system from FIG. 1.

Power to the wireless power chargers 12 is supplied, conditioned, tuned, transformed, converted and/or otherwise changed and/or controlled by one or more control centers 14, as illustrated in FIG. 1. Turning briefly to FIG. 5, each control center 14 may include a rectifier 16, an inverter 18, a processing element 20, a memory element 22, a communication element 24, and a software program 26, each of which is discussed in more detail below. It should also be noted that one or more components of a control center 14 may be housed remotely and/or embedded in or with components of a roadway section 10 without departing from the spirit of the present invention.

The control center 14 receives power from a power supply such as a public utility line and/or from upstream switchgear (not shown), and prepares same for supply to the wireless power chargers 12. For example, in one or more embodiments, the control center 14 receives alternating current (AC) power at 750 kW and 110A, and increases the frequency of the power using the rectifier 16 and inverter 18 for supply to the wireless power chargers 12.

The control center 14 may initially supply power to junction boxes 30, which may each include one or more switching devices 32 and tuning network devices 34. The switching device(s) 32 and corresponding tuning network device(s) 34 may serve as intermediate components for electrical communication between the wireless power chargers 12 and the control center 14. One of ordinary skill will appreciate that more, fewer and/or different intermediate components may be used to supply power to the wireless power chargers 12 without departing from the spirit of the present invention. The exemplary junction boxes 30 are adjacent the sides of the corresponding roadway sections 10 and may be set or embedded in a shoulder of the roadway, with top portions approximately flush with the top surface of the roadway to provide periodic access thereto for maintenance.

In more detail, each junction box 30 may be configured to provide power from the control center to at least one of the roadway sections 10. As such, each junction box 30 may contain or include one or more switching device(s) 32 and corresponding tuning network device(s) 34, with each pair of switching device 32 and tuning network device 34 supplying power to one of the wireless power chargers 12 of a given roadway section 10. Thus, for example, in embodiments in which the roadway sections 10 each include three (3) wireless power chargers 12, each junction box 30 may include three (3) pairs of switching devices 32 and tuning network devices 34. The switching device 32 may, for example, be a metal-oxide-semiconductor field-effect transistor (MOSFET) switch or any other switch device for switching and/or amplifying the power signal to the corresponding wireless power charger 12. The tuning network device 34 may, for example, be a transformer configured to increase or decrease the voltage and/or other characteristics of the power for supply to the corresponding wireless power charger 12. The wires or conductors carrying the power to the wireless power chargers 12 from the junction boxes 30 may be routed through one or more conduits and/or edge connectors 36 illustrated in FIGS. 1 and 2. In some embodiments, adjacent roadway sections 10 in different lanes (i.e., adjacent along the x-axis) may be connected via edge connectors 36, as shown in FIG. 2, such that a given junction box 30 may facilitate power distribution and/or communication with such adjacent roadway sections 10.

Returning to the control center 14, in one or more embodiments, the processing element 20, the memory element 22, the communication element 24 and/or the software program 26 comprise a master controller. The master controller may be in electronic communication (e.g., via the communication element 24) with one or both of the switching devices 32 and/or tuning network devices 34 (of the junction boxes 30) corresponding to each of the wireless power chargers 12 of the pavement system. The electronic communication may permit such electronic devices in each of the junction boxes 30 to provide data regarding operation and/or faults of the wireless power chargers 12 and/or supporting power supply or control infrastructure and/or intermediate components. The electronic communication may also or alternatively permit the master controller to communicate commands to the junction box 30 electronic components and/or components of the wireless power chargers 12, for example where the master controller commands one or more switching device(s) 32 to power or shut down power to the corresponding wireless power charger(s) 12 or commands one or more tuning network device(s) 34 to increase or decrease the voltage of the power supplied to the corresponding wireless power chargers 12.

Figure 2:
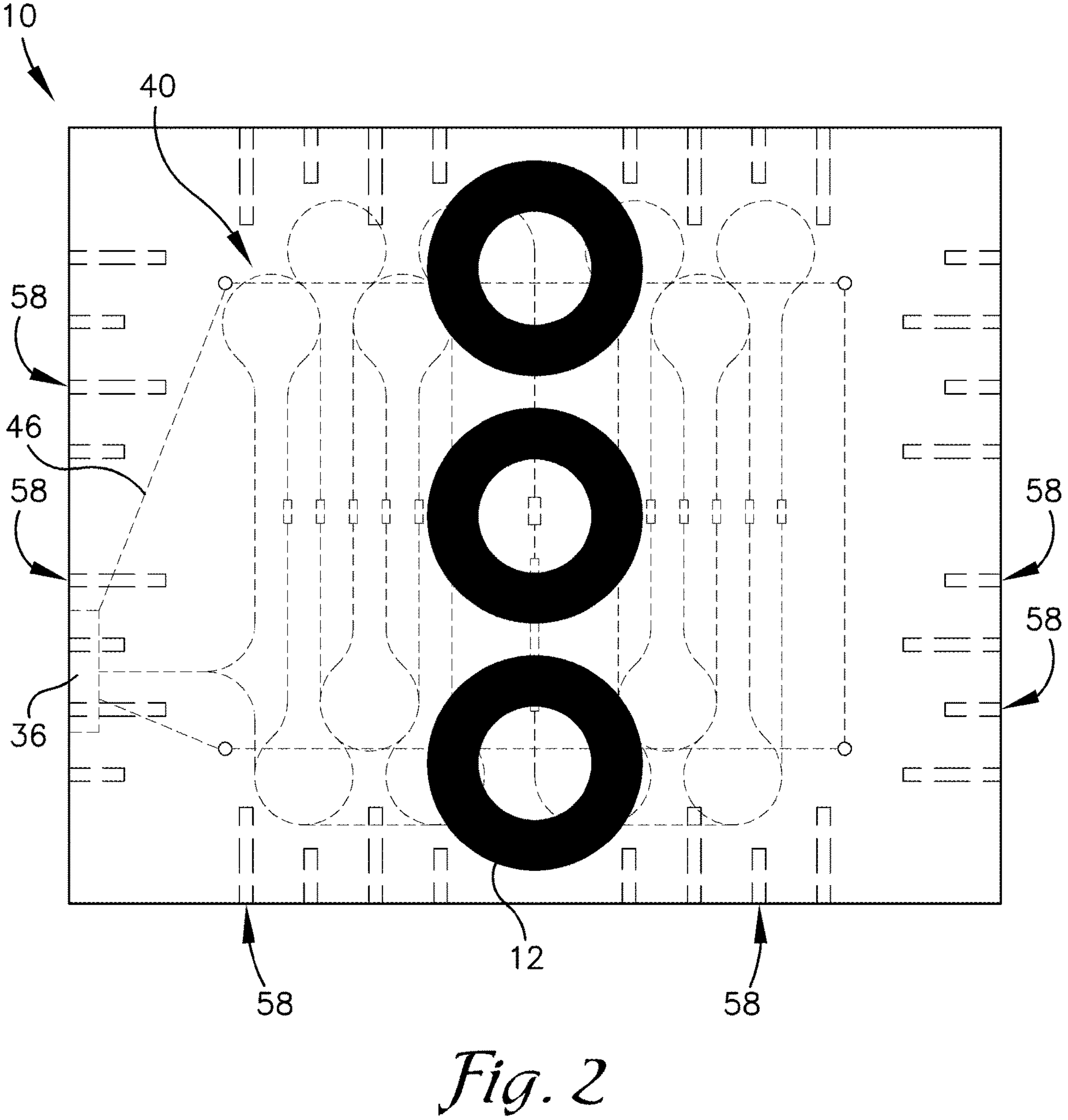
FIG. 2 is a top schematic view of a roadway section from the wireless charging system from FIG. 1, particularly illustrating a strain sensor array and a plurality of wireless power chargers embedded within the roadway section.

Turning to FIG. 2, in one or more embodiments, each roadway section 10 includes one or more sensors 40, which may be used to sense and to generate corresponding data when a vehicle is traveling on the roadway section. In some specific embodiments, the sensors 40 may comprise strain sensors in the form of optical fiber sensors. For example, the sensors 40 may embody optical fiber sensing technologies including but not limited to one or more of Rayleigh, Brillouin, Raman, or Fiber Bragg Grating (FBG) technologies, with corresponding sensors 40 or sampling area(s) distributed along the length of the fiber(s). However, it is also foreseen that the sensors 40 may be alternatively configured or replaced by other sensing technologies without departing from the spirit of the present invention.

The sensor 40 may include and/or be in communication with supporting components—such as an embedded interrogator—within the scope of the present invention. For example, embodiments of the present invention are interoperable with the paving systems and sensor array(s) described in U.S. Patent Publication 2021/0222375 A1 to Sylvester, filed Apr. 9, 2021, and in U.S. patent application Ser. No. 18/048,886 to Sylvester, filed Oct. 24, 2022, each of which is hereby incorporated by reference herein in its entirety. In one or more embodiments, the control center 14 is in electronic communication (e.g., via the communication element 24) with an interrogator which, in turn, operates in conjunction with the sensors 40 to generate sensor data. As described in more detail below, the sensor data may include information indicative of a vehicle traveling and/or passing on the top surface of the roadway section 10.

The total number of sensors 40, as well as the positions of the sensor within the roadway section 10, may be selected based at least in part on their respective intended utility and usage. For example, in connection with configuring a roadway section 10 to read transient signals from a vehicle passing over the roadway section 10, the number, size, and placement of the sensors 40 may be chosen to ensure the sensors 40 are capable of sufficiently detecting and identifying individual vehicle tires, as well as measuring the location, weight, and dimensions of those tires.

Figure 4:
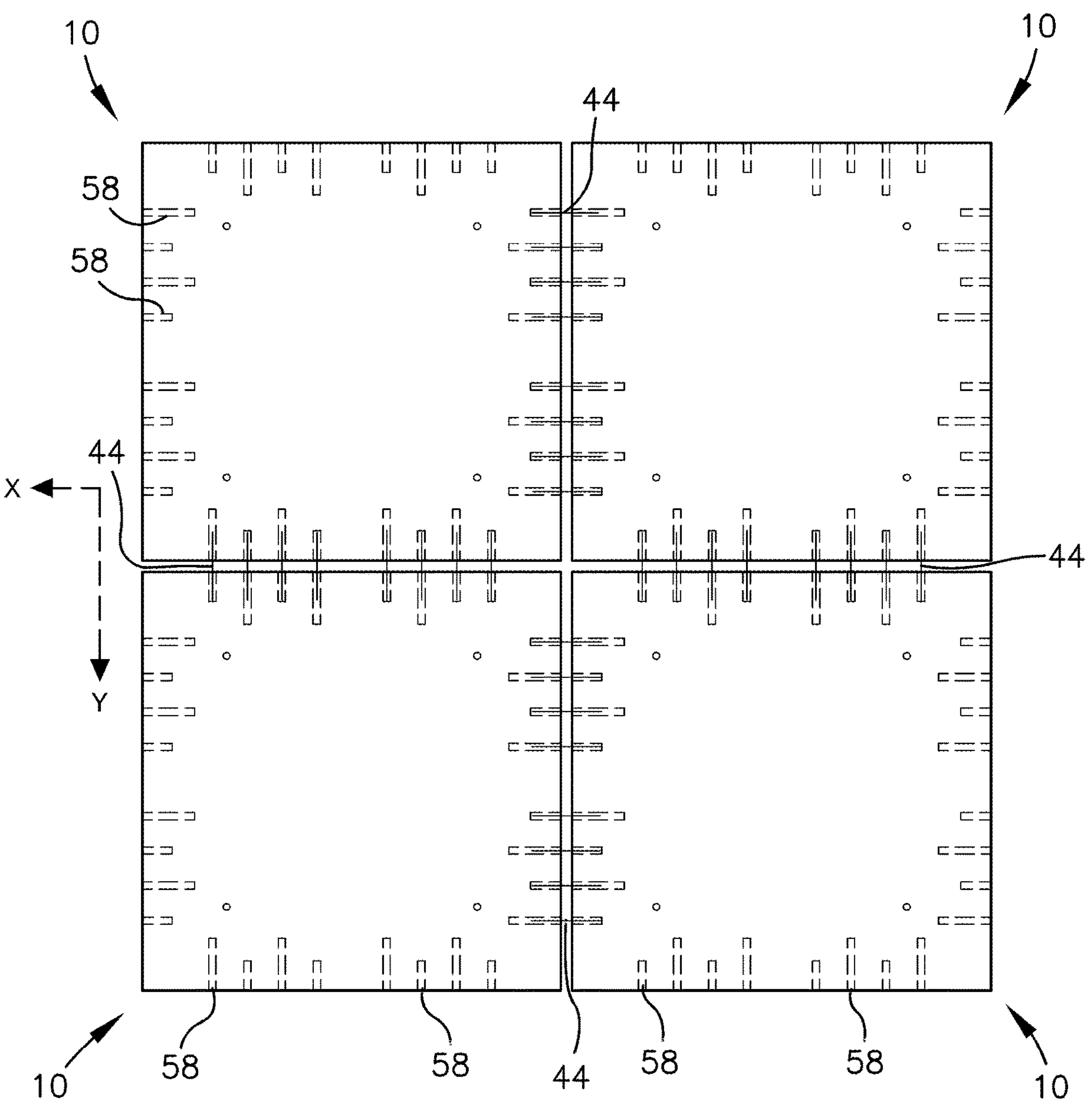
FIG. 4 is a top schematic view of four roadway sections interconnected via load-transferring connectors according to embodiments of the present invention.

Turning briefly to FIG. 4, the roadway sections 10 of the illustrated embodiment also include structural links comprising load-transferring connectors 44 (e.g., dowel rods), discussed in more detail below. However, it should be noted that the paving material of the roadway and delineations between sections 10 or sensing volumes, and associated structural components, may vary within the scope of the present invention. For example, cast-in-place concrete sections delineated by saw cut joints (e.g., without load-transferring connectors), or continuous pour installations (e.g., comprising asphalt without reinforcement layers or load-transferring connectors) are also within the scope of the present invention.

In one or more embodiments, a sensing volume of a section of pavement (e.g., a roadway section 10) may comprise an area of the roadway monitored by sensors 40 comprising fiber optic cable(s) and one or more interrogator (s), where each interrogator transmits and receives optical signals reflecting stress and strain in the section. In one or more embodiments, a sensing volume of a section of pavement comprises an area of the roadway delineated by physical boundaries comprising the sides of a precast slab or a combination of saw cut joints and sides of a cast-in-place concrete installation (either of which may be in the form of a roadway section 10). An advantage of the precast roadway sections 10 of the illustrated embodiment is realized through added data dimensionality available through monitoring condition and/or strains across multiple sensors 40 respectively corresponding to multiple roadway sections 10 interconnected with load-transferring connectors 44 extending therebetween.

Returning to FIG. 1, the master controller of the control center 14 may additionally be in electronic communication (e.g., via wired connections, 46 of FIG. 2) with and may receive sensor data from the sensors 40 embedded in the roadway sections 10. The wired connections 46 may be routed via edge connectors 36 through one or more junction boxes 50 illustrated in FIG. 1 for communication to the master controller (i.e., the control center 14). The master controller may communicate with and/or provide power to the components of the pavement system via wired connections 52. As such, the master controller may analyze the sensor data, alone and/or in communication with one or more remote server(s), to determine vehicle position on the pavement system and roadway sections 10 and, accordingly, provide commands for activation/deactivation of the wireless power chargers 12 and/or increasing or decreasing the voltage supplied to the wireless power chargers 12.

The communication element 24 generally allows communication with systems or devices external to the control center 14. The communication element 24 may include signal or data transmitting and receiving circuits, such as antennas, amplifiers, filters, mixers, oscillators, digital signal processors (DSPs), and the like. The communication element 24 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth™, or combinations thereof. Alternatively, or in addition, the communication element 24 may establish communication through connectors or couplers that receive metal conductor wires or cables which are compatible with networking technologies such as ethernet. The communication element 24 may also couple with optical fiber cables, e.g., via an interrogator. The communication element 24 may be in communication with or electronically coupled to memory element 22 and/or processing element 20.

Preferably the devices of the pavement system communicate via secure and/or encrypted communication means. For example, all or some of the roadway sections 10, the control center 14 and remote server(s) may securely exchange transmissions using DES, 3DES, AES-128 or AES-256 encryption and/or RSA (748/1024/2048 bit) or ECDSA (256/384 bit) authentication. It is foreseen that any means for secure exchange may be utilized without departing from the spirit of the present invention.

The memory element 22 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 22 may include, or may constitute, a "computer-readable medium." The memory element 22 may store the instructions, code, code segments, software, firmware, programs, applications, apps, services, daemons, or the like that are executed by the processing element 20, such as the software program 26. The memory element 22 may also store settings, data, documents, files, photographs, movies, images, databases, and the like, for example where such data is captured by additional infrastructure sensors and/or relates to utilization of the wireless power chargers 14 by passing vehicles.

The processing element 20 may include processors, microprocessors, microcontrollers, DSPs, field-programmable gate arrays (FPGAs), analog and/or digital application-specific integrated circuits (ASICs), or the like, or combinations thereof. The processing element 20 may include digital processing unit(s). The processing element 20 may generally execute, process, or run instructions, code, code segments, software, firmware, programs, applications, apps, processes, services, daemons, or the like. The processing element 20 may also include hardware components, such as finite-state machines, sequential and combinational logic, and other electronic circuits that may perform the functions necessary for the operation of embodiments of the present invention. For example, the processing element 20 may execute the software program 26, where the software program 26 includes computer-readable instructions instructing the processing element 20 to complete all or some of the steps described herein. The processing element 20 may be in communication with the other electronic components through serial or parallel links that include address busses, data busses, control lines, and the like.

In view of the above, embodiments of the present invention are configured to sense when a vehicle is travelling over the road and wirelessly charge the vehicle in response to such sensing. In particular, embodiments of the present invention include sensors 40 embedded within the road, with the sensors 40 being configured to generate data corresponding to the vehicle passing and/or driving on the top surface of the road (e.g., strains and/or stresses on the road). Embodiments additionally include a wireless power charger 12 embedded within the road, with the wireless power charger 12 being configured to induce wireless charging in the vehicle. Embodiment further include at least one control processor, such as processing element 20 of the control center 14, in communication with the sensors 40 and the wireless power charger 12. As such, the control processor is configured to control the wireless power charger 12 (e.g., activate or deactivate the wireless power charger 12) based on the data received from sensors 40. Specifically, for example, when the sensors 40 senses that the vehicle is (or will soon be) traveling on the road, and particularly on the roadway section 10 within which the sensors 40 are embedded, the control processor can instruct the wireless power charger 12 to generate an EMF field to induce wireless charging in the vehicle. Specifically, the wireless power charger 12 can generate the EMF field upward above the top surface of the road so as to be received by the inductive components associated with the vehicle to cause wireless charging of the vehicle's battery.

Figure 3:
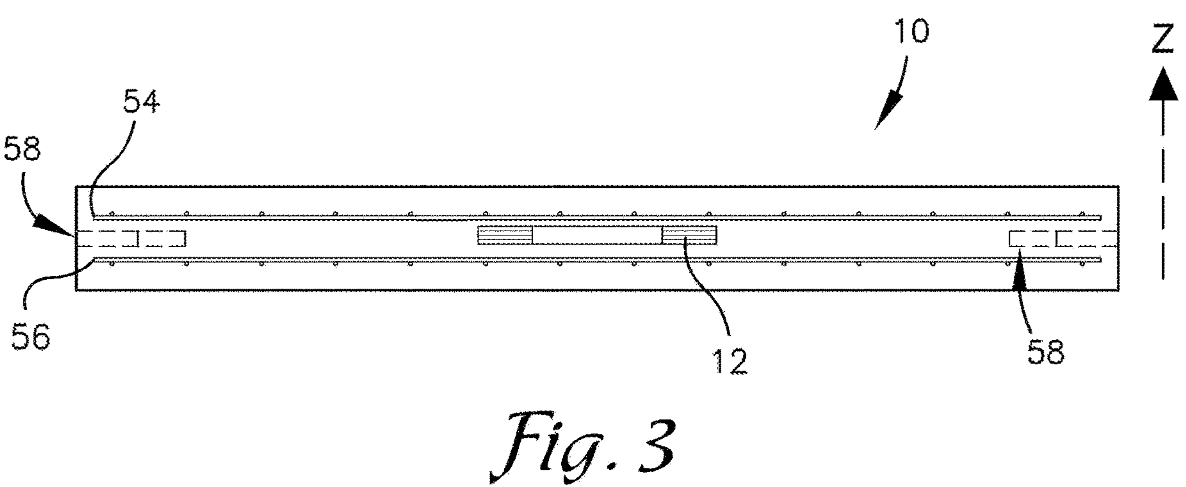
FIG. 3 is a cross section of a roadway section from the wireless charging system from FIG. 1, taken along an x-axis of the system and bisecting a wireless power charger, particularly illustrating the wireless power charger positioned between an upper reinforcement layer and a lower reinforcement layer, all embedded within the roadway section.
Figure 6:
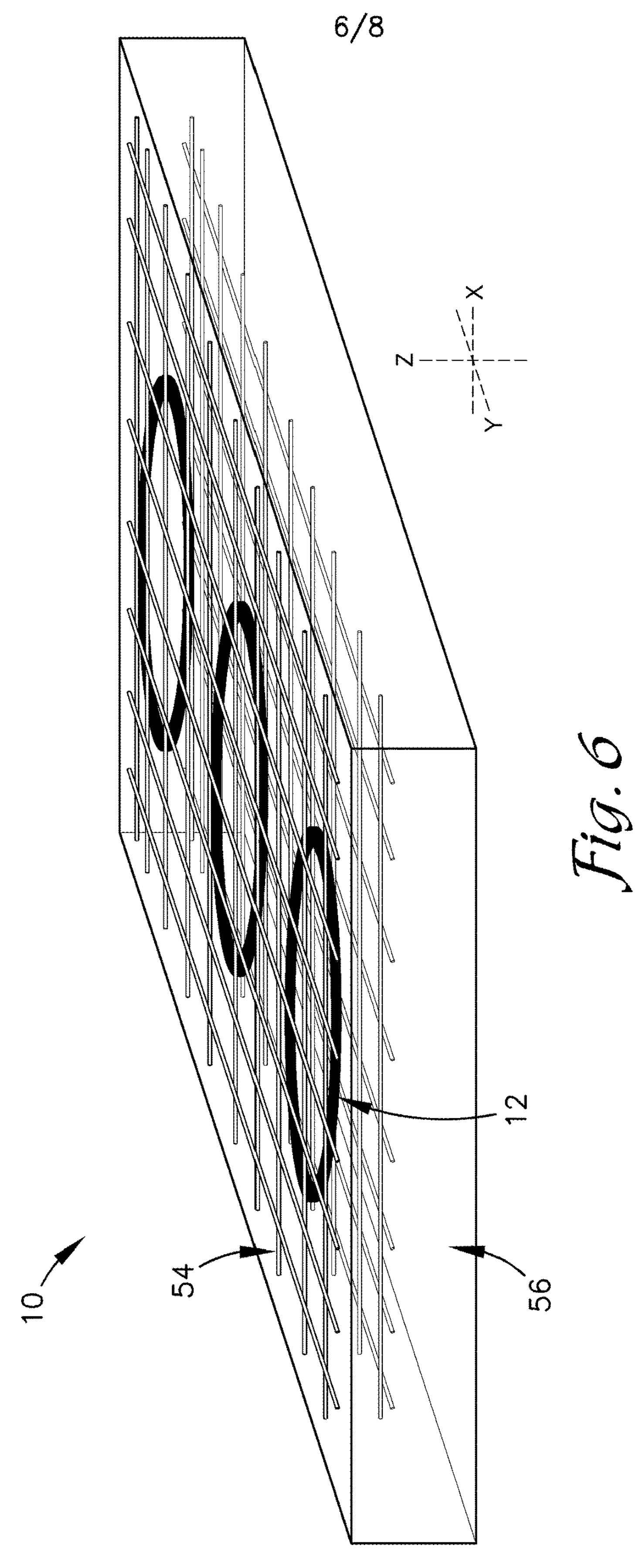
FIG. 6 is a perspective schematic view of a roadway section from the wireless charging system from FIG. 1, particularly illustrating a plurality of wireless power chargers positioned between an upper reinforcement layer and a lower reinforcement layer, all embedded within the roadway section.

With reference to FIGS. 3 and 6, the roadway sections 10 may also each include one or more internal reinforcement layers 54, 56 embedded therein. Such reinforcement layers 54, 56 may be used to enhance the strength, integrity, and/or durability of the roadway sections 10. Although the reinforcement layers 54, 56 may have various shapes and sizes, in some embodiments, the reinforcement layers 54, 56 may comprise a framework of spaced rods, bars, or other elongated elements that are parallel to and/or that cross each other, such as in the form of a grid or a grating as illustrated in FIG. 6.

In some embodiments, the internal reinforcement layers 54, 56 may each extend, within its respective roadway section 10, no less than fifty percent (50%), no less than sixty percent (60%), no less than seventy percent (70%), no less than eighty percent (80%), no less than ninety percent (90%), and/or no less than one-hundred percent (100%) of the length of the roadway section 10. Similarly, the internal reinforcement layers 54, 56 may each extend, within its respective roadway section 10, no less than fifty percent (50%), no less than sixty percent (60%), no less than seventy percent (70%), no less than eighty percent (80%), no less than ninety percent (90%), and/or no less than one-hundred percent (100%) of the width of the roadway section 10. Stated differently, the roadway section 10 (which may be formed as a precast slab) has a perimeter defined by a plurality of sides, and the reinforcement layers 54, 56 are distributed along (i) at least fifty percent (50%) (or at least sixty percent (60%), or at least seventy percent (70%), or at least eighty percent (80%), or at least ninety percent (90%), or at least one-hundred percent (100%)) of a length of the precast slab as defined along the first dimension inside the perimeter, and (ii) at least fifty percent (50%) (or at least sixty percent (60%), or at least seventy percent (70%), or at least eighty percent (80%), or at least ninety percent (90%), or at least one-hundred percent (100%)) of a width of the precast slab as defined along the second dimension inside the perimeter.

As illustrated in FIGS. 3 and 6, the reinforcement layer 54 is generally positioned, within a given roadway section 10, above the wireless power chargers 12 of the roadway section 10, such that the reinforcement layer 54 may be referred to as an upper reinforcement layer 54. Correspondingly, the reinforcement layer 56 is generally positioned, within the given roadway section 10, below the wireless power chargers 12 of the roadway section 10, such that the reinforcement layer 56 may be referred to as a lower reinforcement layer 56.

In some embodiments, the reinforcement layers 54, 56 may comprise at least one layer of metal lattice (e.g., steel or iron rebar) or other internal reinforcement structures such as fiberglass reinforcement mat; geotechnical mat; composite rebar, rods, mats, or structures; polymer (e.g., glass-fiber reinforced polymer) or plastic rebars, rods, mats, or structures; ferrite rebars, rods, mats, or structures; basaltic rebars, rods, mats, or structures; carbon fiber mat, or loose reinforcement material such as fiberglass fibers, carbon fibers, plastic fibers, fine ceramics, or metallic shavings. However, in one or more embodiments, the upper internal reinforcement layer 54 may be comprised of only those non-magnetic shielding materials listed above or otherwise which are non-metallic, non-ferrite material(s) that will not substantially interfere with, shield against, insulate and/or isolate the electromagnetic field (EMF) emitted upward from the wireless power chargers 12, which are positioned below the upper internal reinforcement layers 54. For instance, in some specific embodiments, the upper reinforcement layer 54 may be comprised of polymer, plastic, basaltic, or fine ceramic rebars, bars, mats, loose reinforcements, or other structures. In other embodiments, the upper reinforcement layer 54 may comprise non-magnetic shielding metals, such as aluminum, copper, brass, or tungsten.

In contrast, the lower reinforcement layer 56 may be comprised of any of the above-listed materials, including any of the magnetic shielding materials or non-magnetic shielding materials. For instance, the lower internal reinforcement layer 56 may be comprised of ferrite, as well as ferrous materials (e.g., iron). In certain of such embodiments, e.g., when the lower reinforcement layer 56 is formed from ferrite, the lower reinforcement layer 56 may be non-electrically conductive. Furthermore, however, it is contemplated that either (or both) of the upper and lower reinforcement layers 54, 56 may be formed from materials that are electrically conductive, thermally conductive, or both. Alternatively, either (or both) of the upper and lower reinforcement layers 54, 56 may be formed from materials that are non-electrically conductive, non-thermally conductive, or both.

As used herein, the term "magnetic shielding material" means any material exhibiting a relative magnetic permeability of at least four (4). In certain embodiments, the magnetic shielding material used will exhibit a relative magnetic permeability of at least at least eight (8), at least ten (10), at least one hundred (100), at least five hundred (500), or at least one thousand (1000). In certain preferred embodiments, such as when the magnetic shielding material comprises ferrite, the magnetic shielding material will have a relative permeability between fifteen hundred (1,500) and three thousand (3,000). Furthermore, in some embodiments, the magnetic shielding materials used herein may have a relative magnetic permeability that is at least four (4), at least eight (8), at least ten (10), at least one hundred (100), at least five hundred (500), or at least one thousand (1000) times greater than that of the material from which the roadway sections 10 are formed (e.g., concrete). Examples of magnetic shielding materials include iron, steel, and ferrite. Correspondingly, the term "non-magnetic shielding material" means any material exhibiting a relative magnetic permeability of less than four (4). Examples of non-magnetic shielding material include aluminum, copper, brass, polymers (e.g., glass-fiber reinforced polymer) and plastics, basaltic materials, and fiberglass.

In addition, the term "electrically conductive material" means a material within which electric current freely flows, i.e., a material with a resistivity of less than about $1.0\times10^{-3}$ ohm-meter. Examples of electrically conductive materials include steel, iron, aluminum, copper, graphite and conductive carbon. Correspondingly the term "non-electrically conductive material" means a material within which electric current does not freely flow, i.e., a material with a resistivity greater than about $1.0\times10^{-3}$ ohm-meter. Examples of non-electrically conductive materials include polymer and ferrite. Furthermore, the term "thermally conductive material" means a material within which heat freely flows, i.e., a material with a thermal conductivity greater than about five (5) watts per meter-kelvin. Examples of thermally conductive materials include steel, iron, aluminum, and ferrite. Correspondingly the term "non-thermally conductive material" means a material within which heat does not freely flow, i.e., a material with a thermal conductivity less than five (5) watts per meter-kelvin. Examples of non-thermally conductive materials include polymers.

It is foreseen that embodiments of the present inventive concept, including the upper and lower reinforcement layers 54, 56 are interoperable with the paving systems and apparatuses described in U.S. Patent Publication No. 2016/0222594 A1 to Sylvester (filed Mar. 30, 2016), and in U.S. Patent Publication No. 2017/0191227 A1 to Sylvester (filed May 16, 2016), each of which is hereby incorporated by reference herein in its entirety.

Figure 7:
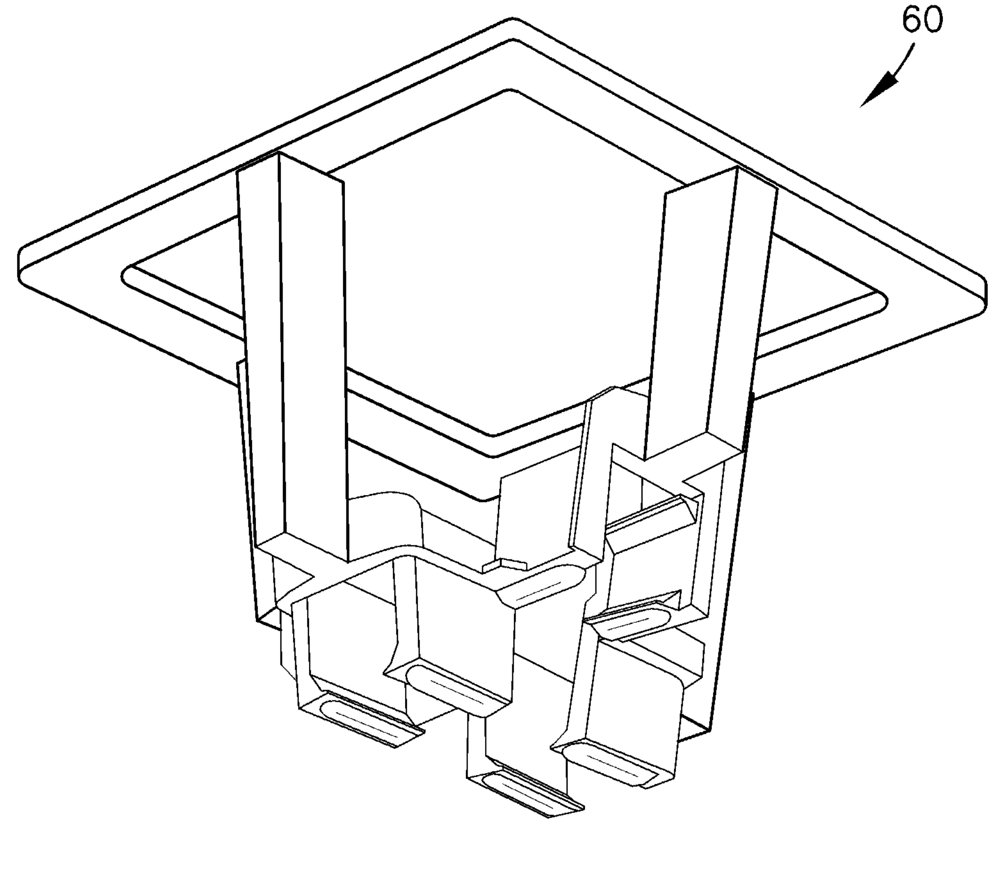
FIG. 7 is a perspective view of a standoff element.
Figure 8:
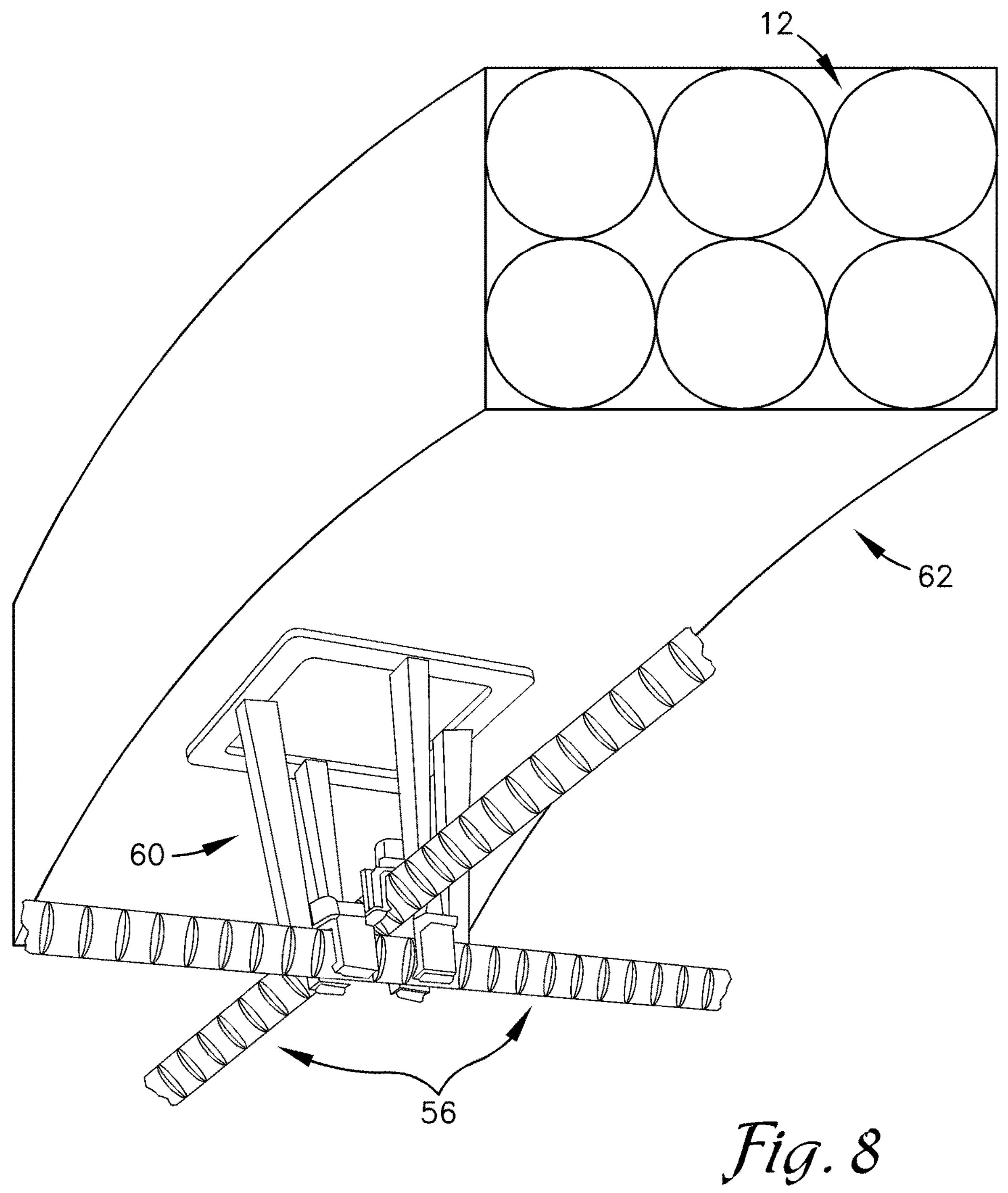
FIG. 8 is a schematic illustration of a wireless power charger being supported above a reinforcement layer by the standoff element from FIG. 7.

As was described above, embodiments provide for the wireless power chargers 12 of a given roadway section 10 to be positioned below the upper reinforcement layer 54 and above the lower reinforcement layer 56. To provide positional stability of such a configuration, as well as to provide other benefits described below, certain embodiments include one or more standoff elements 60, as illustrated in FIGS. 7 and 8, that are configured to support the wireless power chargers 12 with respect to the reinforcement layers 54, 56. The standoff elements 60 may comprise generally rigid chairs, brackets, or other structural supports configured to couple the wireless power chargers 12 to the reinforcement layers 54, 56 and/or to support the wireless power chargers 12 at a certain distance from the reinforcement layers 54, 56. For example, as shown in FIG. 8, an exemplary standoff element 60 is illustrated coupling the wireless power charger 12 to the lower reinforcement layer 56 and supporting the wireless power charger 12 at a particular distance above the lower reinforcement layer 56. In some embodiments, the particular distance may be at least 1 inch, at least 2 inches, at least 4 inches, or at least 5 inches and/or from 2 to 6 inches.

Similarly, a standoff element 60 may couple the wireless power charger 12 to the upper reinforcement layer 54 and support the wireless power charger 12 at a particular distance below the upper reinforcement layer 54. The particular distance may be in accordance with the exemplary particular distances listed above with respect to the lower reinforcement layer 56.

In some embodiments, each standoff element 60 comprises a rebar chair, also known as a rod chair, as shown in FIG. 7. As such, an exemplary standoff element 60 includes a base for engagement with the wireless power charger 12, and a plurality of connectors, e.g., bar/rod connectors, for connection with corresponding portion(s) of the reinforcement layers 54, 56. The base may have a quadrilateral or circular shape. Typically, the standoff element 60 includes four bar/rod connectors, with each bar/rod connector including an attachment feature which clips or couples to a bar/rod of the reinforcement layers 54, 56, as shown in FIG. 8. Furthermore, each bar/rod connector may couple to the base through an individual arm, or all of the bar/rod connectors may couple to the base through a single frame. It should be understood, however, that the standoff element 60 may have other shapes and configurations, as long as the standoff element 60 is capable of coupling the wireless power chargers 12 to the reinforcement layers 54, 56 and/or supporting the wireless power chargers 12 a particular distance from the reinforcement layers 54, 56

Turning to FIG. 8 in more detail, the standoff element 60 is shown engaged with the wireless power charger 12 so that the base of the standoff element 60 contacts the lower surface of the wireless power charger 12. In some embodiments, the inductive coils and/or conductive material of the wireless power charger 12 will be encased in a housing 62 comprising electrically insulating or non-electrically conductive material, such as rubber, as illustrated in FIG. 8. In such embodiments, the standoff element 60 contacts the lower surface of the housing 62. Furthermore, each bar/rod connector of the standoff element 60 is coupled to, and/or in contact with, a bar/rod of the lower reinforcement layer 56. Thus, the standoff element 60 is configured to support the wireless power charger 12 a particular distance above the lower reinforcement layer 56. Although the above description provides how a single standoff element 60 can be used to support a wireless power charger 12 above a lower reinforcement layer 56, it should be understood that multiple standoff elements 60 can be used to support the wireless power charger 12 above the lower reinforcement layer 56, e.g., where the plurality of standoff elements 60 are regularly spaced circumferentially about the wireless power charger 12. Similarly, one or more standoff elements 60 can further be used to support a wireless power charger 12 below an upper reinforcement layer 54. In such embodiments, the orientation of the standoff element 60 would be inverted from that shown in FIGS. 7 and 8

In certain embodiments, the standoff element 60 may be formed from a thermally conductive material, such as ferrite or fine ceramics. As such, when the wireless power charger 12 is generating the magnetic field (i.e., to transmit wireless power to a vehicle), and as a result, generating heat, the thermal energy can flow from the wireless power charger 12 through the base of the standoff element 60 and through each bar/rod connector to the coupled bars/rods of the reinforcement layers 54, 56 which dissipate the heat through the body of the roadway section 10. Further, in certain embodiments, the standoff element 60 may be formed from a non-magnetic shielding material. Furthermore still, the standoff element 60 may be formed from a material that is both non-magnetic shielding and thermally conductive.

In view of the above, embodiments of the present invention may include a roadway section 10 configured to wirelessly charge a vehicle driving on the roadway section. The roadway section 10 may comprise a reinforcement layer embedded within the roadway section 10. The roadway section additionally comprises a wireless power charger 12 embedded within the roadway section 10, with the wireless power charger 12 being configured to transmit energy wirelessly to the vehicle. In certain embodiments, the reinforcement layer comprises non-magnetic shielding material that will not interfere with the transmission, via the wireless power charger 12, of an electromagnetic (EMF) field up through and above the top surface of the corresponding roadway section 10. As a result, the reinforcement layer may be either the upper reinforcement layer 54 or the lower reinforcement layer 56. In alternative embodiments, the reinforcement layer will comprise magnetic shield material, which may interfere with the transmission of an electromagnetic (EMF) field up through and above the top surface of the corresponding roadway section 10. Thus, in such embodiments, the reinforcement layer is a lower reinforcement layer 56 that is positioned below the wireless power charger 12, so as to not interfere with such EMF transmission.

In addition, or in other embodiments, the roadway section 12 may comprise a pair of reinforcement layers embedded within the roadway section 10, with the reinforcement layers including an upper reinforcement layer 54 positioned above the wireless power charger 12 and a lower reinforcement layer 56 positioned below the wireless power charger. In such embodiments, the upper reinforcement layer 54 will comprise only non-magnetic shielding material, while the lower reinforcement layer 56 can comprise either non-magnetic shielding material or magnetic shielding material. Generally, in preferred embodiments, the roadway section 10 will not comprise any magnetic shielding material above the wireless power charger 12.

It is foreseen, as noted above, that embodiments of the present invention may be constructed in the field—for example as part of cast-in-place concrete or continuous pour asphalt installations—or be pre-fabricated into an assembly that can be installed onsite. Regardless, in some embodiments, the sensors 40 may be laminated and/or fixed to a bottom side of the lower or bottommost reinforcement layer 56 of the roadway section 10. Placement near the bottom of the body of the roadway section 10 may provide greater resolution from and/or amplification of data collected by the sensors 40. Moreover, fixing the sensors 40 to one or both of the reinforcement layers 54 and/or 56 may generate a more holistic data set representing changes in form across the entire body of the roadway section 10 because a preferred reinforcement layer 54, 56 will extend across substantially the entire length and width of the body of the roadway section 10 and may be less susceptible to localized distortions resulting from pockets or imperfections in the body.

As noted above, in one or more embodiments, load-transferring connectors 44 (see FIG. 4) may be set in cavities 58 formed in the roadway sections 10 to join the roadway sections 10 to one another (or other adjacent structures) along sides extending perpendicular to the direction of travel (i.e., in the “x” direction). In one or more embodiments, load-transferring connectors 44 also join the roadway sections 10 to one another (or other adjacent structures) along sides extending parallel to the direction of travel (i.e., in the “y” direction). The load-transferring connectors 44 may comprise, for example, dowel rods. However, in one or more embodiments, roadway sections 10 adjacent one another in the "x" direction may be joined using tie bars (not shown) or other load-transferring connectors. Interfaces between roadway sections 10 may also or alternatively incorporate a rubber skirt, backer board, spacing rod, tar mixture, grouting or similar buffering substance within the scope of the present invention. It is also foreseen that load-transferring connectors may be omitted along one or more sides of slabs or roadway sections without departing from the spirit of the present invention.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

The invention claimed is:

1. A roadway section configured to wirelessly charge a vehicle driving over a top surface of the roadway section, said roadway section comprising:

a reinforcement layer embedded within the roadway section below the top surface, wherein the reinforcement layer comprises non-magnetic shielding material; and a wireless power charger embedded within the roadway section below the top surface such that the wireless power charger is configured to transmit energy at least through the top surface of the roadway section wirelessly to the vehicle.

2. The roadway section of claim 1, wherein the reinforcement layer is positioned above the wireless power charger.

3. The roadway section of claim 1, wherein the reinforcement layer is a first reinforcement layer, further comprising a second reinforcement layer embedded within the roadway section.

4. The roadway section of claim 3, wherein the second reinforcement layer is positioned below the wireless power charger.

5. The roadway section of claim 4, wherein the second reinforcement layer is comprised of non-magnetic shielding material.

6. The roadway section of claim 4, wherein the second reinforcement layer is comprised of magnetic shielding material.

7. The roadway section of claim 3, further including at least one standoff element supporting the wireless power charger a predefined distance above the second reinforcement layer.

8. The roadway section of claim 7, wherein the standoff element contacts both the wireless power charger and the second reinforcement layer.

9. The roadway section of claim 7 wherein the standoff element comprises a non-magnetic shielding material.

10. The roadway section of claim 9, wherein the non-magnetic shielding material of the standoff element is thermally conductive.

11. The roadway section of claim 10, wherein the non-magnetic shielding material of the standoff element comprises fine ceramics.

12. The roadway section of claim 7, wherein the predefined distance is at least four inches.

13. The roadway section of claim 7, wherein the wireless power charger is encased in a housing.

14. The roadway section of claim 1, wherein the roadway section is formed from concrete.

15. The roadway section of claim 1, wherein the roadway section comprises a cast-in-place slab.

16. The roadway section of claim 1, wherein the roadway section comprises a pre-cast slab in which the reinforcement layer and the wireless power charger are embedded, further comprising a plurality of load-transferring connectors embedded along one of a plurality of sides of the slab and attached to an adjacent structure, the plurality of load-transferring connectors being configured to transfer load on the precast slab corresponding to the passing vehicle between the precast slab and the adjacent structure.

17. The roadway section of claim 1, wherein the non-magnetic shielding material comprises glass fiber reinforced polymer.

18. The roadway section of claim 1, wherein the non-magnetic shielding material comprises basaltic material.

19. The roadway section of claim 1, wherein the non-magnetic shielding material comprises plastic material.

20. A method of wirelessly charging a vehicle traveling over a top surface of a roadway section, said method comprising the steps of:

(a) providing a reinforcement layer embedded within the roadway section below the top surface, wherein the reinforcement layer comprises non-magnetic shielding material;

(b) providing a wireless power charger embedded within the roadway section below the top surface; and (c) transmitting, via the wireless power charger, energy at least through the top surface of the roadway section wirelessly to the vehicle as the vehicle travels over the roadway section.

* * * * *